May 26, 1953        R. F. BECKER        2,640,113
SOLENOID CONTROLLED CORD REEL
Filed Jan. 25, 1950        2 Sheets-Sheet 1
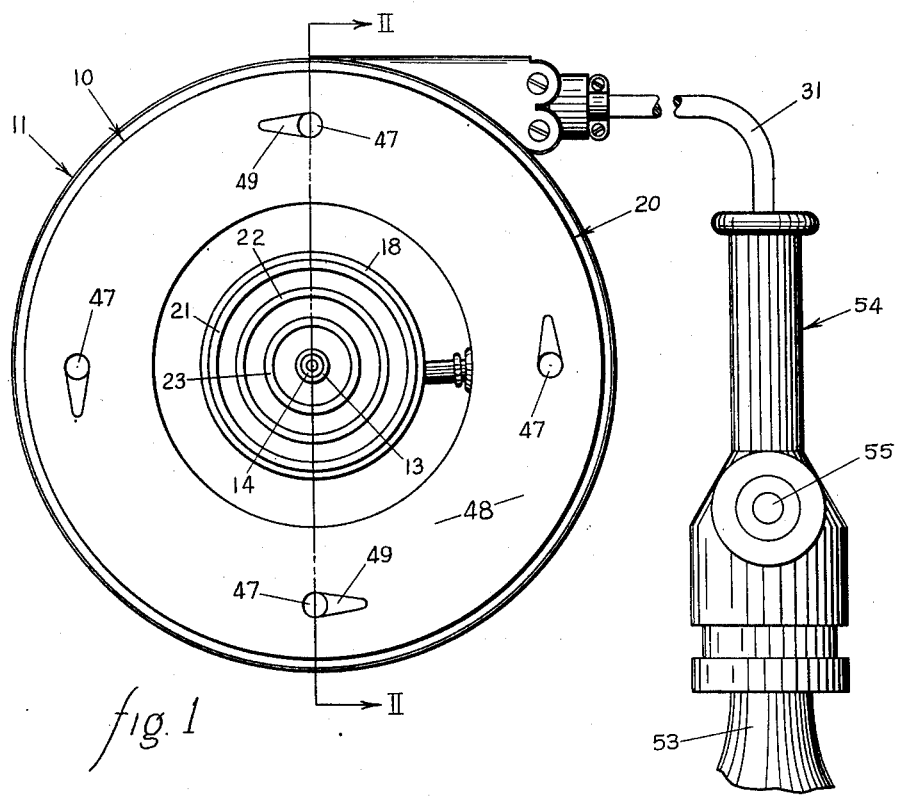
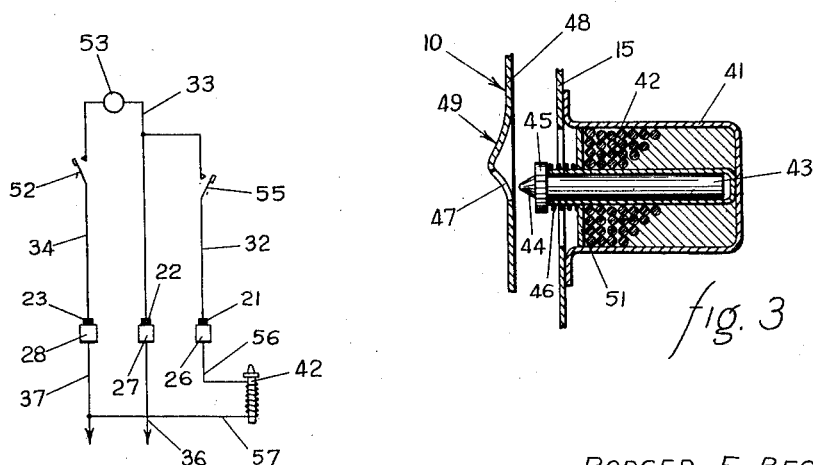
Inventor
RODGER F. BECKER
By 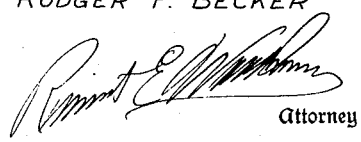
Attorney May 26, 1953  R. F. BECKER  2,640,113
SOLENOID CONTROLLED CORD REEL
Filed Jan. 25, 1950  2 Sheets-Sheet 2

Inventor
RODGER F. BECKER
By
Attorney

Patented May 26, 1953

2,640,113

UNITED STATES PATENT OFFICE 2,640,113

SOLENOID CONTROLLED CORD REEL

Rodger F. Becker, Kalamazoo, Mich.

Application January 25, 1950, Serial No. 140,492

1 Claim. (Cl. 191—12.2)

This invention relates in general to a spring actuated, extension cord reel and more particularly to a type thereof having a manually controllable, solenoid actuated, detent mechanism for controlling the rewinding of the extension cord upon the reel.

Persons familiar with the use and operation of automatic rewind reels for electrical extension cords have long recognized the need for a type thereof having manually controllable means, preferably associated with the extension lamp, for controlling the rewinding of the cord reel whereby the extension cord is retracted into the reel housing. Although devices of this type have been conceived for this purpose, they have, for one or more reasons, been found unsatisfactory, particularly where the working space is limited, or where the equipment in such space would be disturbed by uncontrolled movements of the extension cord during the retraction thereof.

Accordingly, a primary object of this invention is the provision of a spring actuated reel for an electrical extension cord, which reel is provided with manually controllable means for remotely controlling the rewinding of the extension cord upon the reel.

A further object of this invention is the provision of a remotely controllable device mounted upon the reel housing for selectively engaging the reel whereby rotation of said reel in that direction effecting retraction of the extension cord can be positively controlled.

A further object of this invention is the provision of a cord retraction control device, as aforesaid, having a manually controllable, normally open switch associated with the extension lamp on said cord whereby the extension cord may be withdrawn from the cord reel as desired, within the limitations of its length, but which will prevent retraction of said cord by said spring into the reel housing unless the switch is manually closed.

A further object of this invention is the provision of a retraction control device controlled by a remote switch, as aforesaid, whereby the control device is released only when the said switch is being manually closed and is effective to prevent retraction of the extension cord whenever the switch means is released.

Other objects and purposes of this invention will become apparent to persons familiar with this type of equipment upon referring to the accompanying drawings and upon reading the following specification.

In meeting those objects and purposes heretofore mentioned, as well as others incidental thereto and associated therewith, I have provided a reel housing having a cord reel rotatably supported therewithin, and means resiliently and controllably resisting rotation of said reel within said reel housing whereby retraction of the extension cord is effected. I have mounted a solenoid upon the housing adjacent to one rim of said reel and have provided a plurality of openings in said rim engageable by the core bar of the solenoid during rotation of the reel.

For illustrations of a preferred embodiment of my invention, reference is made to the accompanying drawings in which:

Figure 1 is a side elevation view of the cord reel to which this invention relates showing the reel housing with one side removed therefrom.

Figure 3 is an enlarged sectional view of Figure 2 taken along the line II—II with the core bar retracted.

Figure 4 is a wiring diagram of my invention.

Construction

For the purpose of convenience in description, the terms "inner" or "inside" and "outer" or "outside," as used in this specification, will be understood to have reference to the geometric center of the cord reel or the cord reel housing, and parts thereof.

Figure 2:
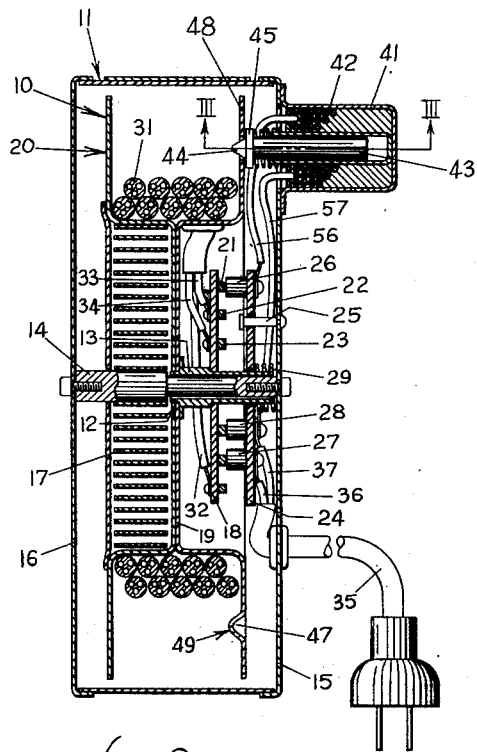
Figure 2 is a sectional view substantially as taken along the line II—II of Figure 1 with said side cover of the reel housing in position, and with the core bar of the solenoid engaging the cord reel rim.

As shown in Figures 1 and 2, the circular cord reel 10 which is rotatably supported within the reel housing 11 is provided with a coaxial sleeve opening 12 in the center of plate 19 through which a reel sleeve 13 extends. The reel sleeve is in turn rotatably supported upon the reel shaft 14, which is secured at opposite ends thereof to, and is supported upon, the front and back covers 15 and 16, respectively, of the reel housing 11. The cord reel 10 is preferably so disposed within the reel housing 11 and upon the reel sleeve 13 that the said sleeve extends from said reel toward, but is spaced from, the front cover 15.

A reel spring 17, which is secured to and extends between the reel shaft 14 and the rim 20 of the reel 10, is disposed between the center plate 19 and the housing back cover 16 in a conventional manner. Details regarding the construction of the cord reel 10 and the manner in which the reel spring 17 is secured to the reel shaft 14 and reel rim 20 are substantially fully disclosed in patent application Serial No. 16,099, filed March 20, 1948, by J. S. Komassa and now Patent No. 2,543,176, dated February 27, 1951. Therefore, further details relating thereto will be omitted from this application.

A slip ring support disk 18, which is preferably fabricated from an insulating material, is sleeved upon and secured to the reel sleeve 13 parallel with and spaced from the cord reel center plate 19. Three concentric, spaced rings 21, 22 and 23 are mounted upon that side of the ring disk 18 remote from the cord reel. A contact support disk 24, which is also fabricated from an insulating material, is provided with an opening through which the reel sleeve 13 may slidably and rotatably extend. The contact disk 24 is axially reciprocably mounted upon the front cover 15 by any convenient means, such as mounting pins of which one is shown at 25, and is disposed between the slip ring disk 18 and the front cover 15, and spaced therefrom.

Three contactors 26, 27 and 28 are secured to and disposed upon that face of the contact disk 24 adjacent to the slip ring disk 18 for engagement with the slip rings 21, 22 and 23, respectively. A coiled spacer spring 29 is sleeved upon the reel sleeve 13 and disposed under compression between the front cover 15 and contact disk 24 for urging the contactors 26, 27 and 28 into positive engagement with the slip rings 21, 22 and 23, respectively, when the front cover 15 is mounted upon the reel housing 11.

The reel cord 31 is provided with at least three electrical conductors which are electrically connected to the slip rings 21, 22 and 23, as shown in Figure 2. The lead-in cord 35 preferably contains at least two conductors 36 and 37 which are connected to the radially inner contactors 27 and 28, respectively.

A solenoid housing 41, which may be secured to, and mounted upon, the outside surface of the front cover 15 near the periphery thereof, is provided with a field coil 42 of any convenient, conventional type which surrounds a solenoid core bar 43. An opening is provided in the reel housing front cover 15 through which the core bar 13 may extend into the reel housing 11. The inner end 44 of the core bar 43 is tapered substantially to a point and provided with a radially outwardly extending annular flange 45 adjacent to said tapered end (Figures 2 and 3). A coiled core spring 46 is sleeved upon the core bar 43 and is held under compression between the annular flange 45 and the adjacent surface of the field coil 42 for the purpose of urging the core bar toward the reel rim 20.

A plurality of detent openings 47, here four (Figures 1, 2 and 3), are provided at spaced intervals about the rim sidewall 48. The detent openings 47 are preferably disposed radially equidistantly from the shaft 14 for appropriate reception of the tapered end 44 of the core bar 43. That portion of the rim sidewall 48 adjacent to the trailing edge of each detent opening 47, when said reel is rotating in a clock-wise direction as appearing in Figure 1, is provided with a groove 49 (Figure 2) inclined away from the adjacent front cover 15 and increasing in depth toward said opening, whereby engagement between the tapered end 44 of the core bar 43 and the wall of the detent opening 47 may be assured when the reel is being rotated in the direction effecting a retraction of the extension cord, such engagement being effected by the core spring 46. The maximum depth of the groove 49, which is adjacent to the detent opening, is preferably greater than the distance between the flange 45 and the tip of the tapered end 44 of the core bar, for reasons disclosed hereinafter.

As shown in Figures 2 and 4, current is supplied from a convenient source, not shown, through the conductor 37 in the lead-in cord 35, through the contactor 28, the ring 23, the conductor 34, the switch 52, a lamp 53 mounted in the extension lamp handle 54, through the conductor 33, the slip ring 22, the contactor 27 and the conductor 36. Current is supplied to the solenoid field coil by passing from said source through the conductor 36, the contactor 27, slip ring 22, the conductor 33, the switch 55, the conductor 32, the slip ring 21, the contactor 26, the conductor 56, the solenoid field coil 42, the conductor 57 and the conductor 37. This places the solenoid directly across the line voltage.

The switches 52 and 55 may be of any conventional type, however, the switch 55 is preferably of the type normally held in open position by resilient means and adapted for moving into closed position by manual actuation, such as by being pressed by the operator's thumb or finger.

Accordingly, retraction of the solenoid core bar 43 into the solenoid housing 41, can be effected by energization of the coil 42 through manual actuation of the switch 55 without effecting the luminosity of the lamp 53. Likewise the lamp 53 can be turned on or off without affecting the core bar 43.

Operation

As shown in Figure 2, the solenoid core bar 43 is normally in the extended position, being so urged by the core spring 46, so that the tip of the tapered end 44 is bearing against the reel rim sidewall 48 or is disposed within one of the detent openings 47. Since the depth of each groove 49 adjacent to its corresponding detent opening 47 is greater than the distance between the tip of the tapered end 44 and the flange 45, which rides on the rim sidewall 48 when said tapered end is seated in a detent opening, the reel 10 can be rotated in a cord extending direction, or clockwise as appearing in Figure 1, without requiring actuation of the switch 55.

However, that edge of each detent opening 47, opposite the groove 49, is flush with the rim 48 and thereby prevents a counter-clockwise, or cord retracting, rotation of the reel 10 when the tapered end 44 is seated in a said opening. Such counter-clockwise rotation of the reel 10 is continuously urged by the reel spring 17.

As the reel 10 rotates, the slip ring support disk 18 rotates therewith. However, the contact support disk 24, being mounted upon the front cover 15, is held non-rotatable with respect thereto. Accordingly, the contactors 26, 27 and 28, pass current to the circular slip rings 21, 22 and 23 in a conventional manner. Thus, current is being passed continuously from lead-in cord 35 through the contactors and slip rings and various corresponding conductors both to the lamp switch 52 and the solenoid switch 55 mounted upon the extension lamp handle 54.

When the solenoid switch 55 (Figures 1 and 4) is closed, the solenoid core bar 43 is retracted into the solenoid housing 41 in a conventional manner, thereby releasing the cord reel 10 to rotate in said counter-clockwise direction under urging of the spring 17. As long as the solenoid switch 55 is held in the closed position, the core bar 43 will remain retracted and will thereby continue to permit the reel spring 17 to effect a retraction of the cord 31 into the housing 11. However, as soon as the solenoid switch 55 is closed, the coil 42 is deenergized and the solenoid core bar 43 is again urged into the extended position (Figure 2) by the core spring 46 so that the tip of the tapered end 44 will engage the rim sidewall 48 and the end 44 will be received into the next detent opening 47 passing into line therewith. Thus, the operator will have full control of both extension and retraction of the cord, as well as turning the lamp on and off, by one hand at the handle 54 and the other cannot race uncontrolled back into its housing.

Modification

Figure 5:
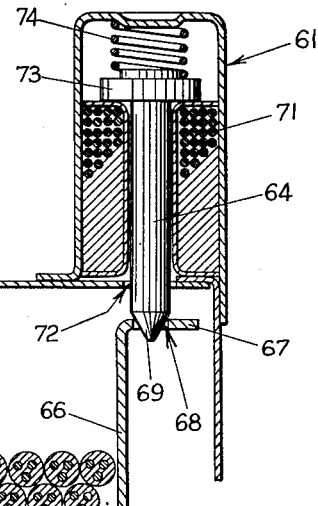
Figure 5 is a fragmentary sectional view of a modified structure substantially as taken along the line II—II of Figure 1.

The solenoid housing 61 (Figure 5) may be alternatively mounted upon the peripheral wall 62 of the reel housing 63 so that the longitudinal axis of the core bar 64 is radially disposed with respect to the cord reel 65. In such case, the rim 66 of the reel 65 is provided with a cylindrical flange 67 substantially coaxial with the cord reel 65. The flange 67 is provided with a plurality of spaced openings 68 engageable by the tapered end 69 of the core bar 64, which is reciprocably mounted within the solenoid coil 71 in the solenoid housing 61 for controllable extension through an appropriate opening 72 in the peripheral sheet 62.

The core bar 64 may be provided with a circular flange 73 at that end thereof remote from the tapered end 69 and disposed within a space between the adjacent end of the solenoid coil 71 and the solenoid housing 61. The tapered end of the core bar 64 is urged against the cylindrical flange 67, or into one of the openings 68 therein, by a spring 74 disposed under compression between said circular flange 73 on the core bar 64 and the adjacent end of the solenoid housing 61. It will be observed that the extension of the core bar 64 is limited by engagement between the circular flange 73 and the solenoid coil 71.

The core bar 64 is retracted into the solenoid housing, against the force of the spring 74, when the solenoid coil is energized in the same manner as shown in Figure 4 for the device shown in Figures 1 to 3. If the sidewalls of the openings 68 are not recessed along an edge thereof, as are the openings 47 (Figure 3), the core bar 64 must be retracted to permit the rotation of the reel 65 in either direction, thereby providing releasable, but positive, locking of said reel against such rotation.

Although the above mentioned drawings and description apply to particular preferred embodiments of my invention, it is not my intention, implied or otherwise, to eliminate other variations or modifications which do not depart from the scope of this invention unless specifically stated to the contrary in the hereinafter appended claim.

I claim:

A selectively operable uni-directional brake for controlling the rotation of a reel for electrical cord, said reel having a drum and a spring adapted to rotate said drum in a direction to wind said cord thereon, said drum having a plurality of openings in one side, one edge of each of said openings having an inclined trough away from said opening in the direction of rotation of said drum as it winds up said cord, said brake comprising: a solenoid including a plunger and a spring urging said plunger into said openings in said drum; said cord being of the three conductor type having a primary circuit and a secondary circuit utilizing a common conductor; said secondary circuit being connected to said solenoid; a switch in said secondary circuit at the end of said cord remote from said drum, whereby said solenoid may be activated from said remote end of said cord without interference with said primary circuit.

RODGER F. BECKER.

References Cited in the file of this patent

UNITED STATES PATENTS

| Number | Name | Date |
|---|---|---|
| 807,965 | Rice | Dec. 19, 1905 |
| 1,244,445 | Pratt | Oct. 23, 1917 |
| 1,763,811 | Occhiuzzo | June 17, 1930 |
| 2,097,537 | Snyder | Nov. 2, 1937 |
| 2,317,344 | Hood | Apr. 27, 1943 |
| 2,443,763 | Dahlgren | June 22, 1948 |

FOREIGN PATENTS

| Number | Country | Date |
|---|---|---|
| 122,221 | Sweden | July 13, 1948 |